Feb. 9, 1943.  DE V. V. CARTER  2,310,393
DOUBLE PINION APPLICATION OF POWER
Filed July 29, 1937  4 Sheets-Sheet 1

Inventor
D. V. CARTER.
Jesse R. Stone
Lester B. Clark
By
Attorneys.

Feb. 9, 1943. DE V. V. CARTER 2,310,393
DOUBLE PINION APPLICATION OF POWER
Filed July 29, 1937 4 Sheets-Sheet 4

Inventor
D. V. CARTER.
Jesse R. Stone
Lester B. Clark
By
Attorneys.

Patented Feb. 9, 1943

2,310,393

UNITED STATES PATENT OFFICE 2,310,393

DOUBLE PINION APPLICATION OF POWER

De Vere V. Carter, Dallas, Tex.

Application July 29, 1937, Serial No. 156,380

5 Claims. (Cl. 74—410)

The invention relates to a mechanism for reducing the speed and applying the power from a power unit. In many present day operations it is desirable to transmit loads of considerable magnitude through gearing, chain drives or by belts in applying power in order to transmit such a load in many instances the contact pressures between the parts are so large that lubrication of the parts becomes difficult, if not impossible, and it is, therefore, one of the objects of the invention to provide a mechanism whereby the contact area between the parts may be enlarged while still utilizing a simple and economical apparatus.

It is one of the objects of the invention to provide a mechanism wherein two points of contact are provided for application of power from a driving to a driven member.

Another object of the invention is to provide in combination with a speed reducing mechanism the feature of a distribution of the point of application of the power so that no excessive load will be applied at any one point.

Another object of the invention is to provide a double pinion arrangement for contacting a driven member so that the load can be applied from opposite sides of the driven member to create a torque couple.

Another object of the invention is to provide in combination with a well pumping unit a source of power whereby the pressure to move the load can be applied at a plurality of points.

Other and further objects of the invention will be readily apparent when the following description is considered in connection with the accompanying drawings wherein.

Figure 1:
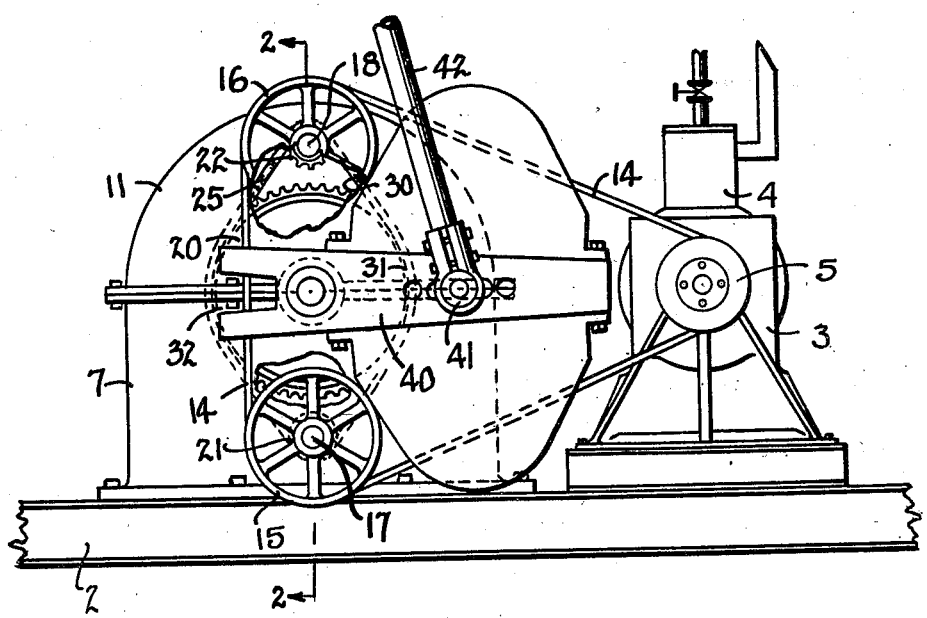
Fig. 1 is a side elevation of a counterbalanced pumping unit to which the invention has been applied.

In Fig. 1 a pumping unit assembly has been illustrated as embodying a base 2 upon which a power unit 3 has been mounted. In this particular instance an internal combustion engine 4 has been illustrated but it is to be understood that any source of power may be utilized for turning the wheel or sheave 5.

The housing 7 encloses the crank shaft 8 and carries the bearings 9 which support such crank shaft and encloses the mechanism for partially reducing the speed of the power unit. This housing 7 is completely enclosed and includes the cap portion 11.

In order that the power may be transmitted from the unit 3 to the crank shaft 8 a series of connections have been made which are best seen in side elevation in Fig. 1 and include the mutiple belt connection 14 which passes around the wheel or sheave 5 and around the pinion wheels 15 and 16, which are mounted upon the shafts 17 and 18, respectively. These shafts are in turn carried in bearings 19 in the housing 7 so that the wheels 15 and 16 are rotatable with respect to the housing. It should be particularly noted that the belt 14 assumes a triangular configuration due to the positioning of the three wheels 5, 15 and 16. Any desired number of belts may be applied to these wheels in order to transmit the intended load.

Figure 2:
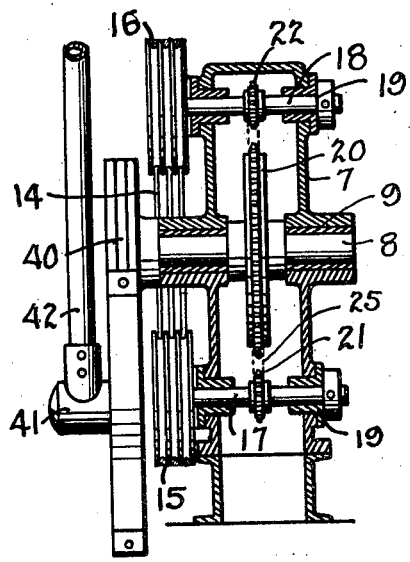
Fig. 2 is a section taken on the line 2—2 of Fig. 1 and looking in the direction of the arrows, with the counterbalance dropped down to a vertical position.

Inside of the housing 7 is the drive wheel 20, which is affixed to the crank shaft 8. This wheel is considerably larger than the pinion wheels or sprockets 21 and 22 which are carried on the shafts 17 and 18, respectively. As seen in Figs. 1 and 2, the wheels 20, 21 and 22 are sprockets which are arranged to receive the chain 25. The relative size of the pinion sprockets and drive sprocket is such that there is a substantial reduction in speed between the rates of rotation.

With pumping units of the type illustrated in Figs. 1 and 2 it has become necessary with the advent of the deeper wells to transmit tremendous loads with a unit of this sort in order to effect reciprocation of the pump, the sucker rods and the column of oil in the well.

It is well known of course that a chain and sprocket drive connection can transmit only a predetermined load depending upon the size and configuration of the teeth and the chain; that a predetermined pressure can be transmitted by a tooth and chain connection and when this pressure is exceeded the lubricant will be expelled from between the parts and undue and excessive wear will immediately result so that the parts when overloaded will not render satisfactory service.

With the foregoing in view particular attention is directed to the arrangement of the sprockets 20, 21 and 22 in that the pinions 21 and 22 are positioned on opposite sides of the sprocket and power is applied from the power unit 3 to both of these pinions by virtue of the belts 14 passing over the wheels 15 and 16. When the chain 25 is passed over these two sprockets and the drive sprocket it seems obvious that a torque couple is provided which tends to rotate the sprocket 20 by exerting a pull on opposite sides thereof. Thus, if the wheel 5 is rotated in a counter-clockwise direction the wheels 15 and 16 would be similarly rotated, so that there would be a pull from the sprocket 22 on the right-hand side 31 of the drive sprocket 20. Similarly as the sprocket 21 is rotated in a counter-clockwise direction there would be a pull on the lefthand side 32 of the drive sprocket 20, so that in effect the chain would be divided into four segments between its contacts with the pinions and the drive sprocket.

The alternate segments on the upper righthand side and the lower lefthand side would be under tension tending to rotate the drive sprocket while the other two segments would not carry any load. The net result of this arrangement is that there are two contacts with the drive sprocket 20 so that the power is applied on opposite sides thereof in the nature of a couple, which tends to rotate the drive sprocket and, due to the double contact, reduces the individual sprocket tooth pressure which is applied at any one point and results in an even distribution of the pressure rather than a concentration of it at one point. This distribution of pressure equalizes the thrust on the crank shaft bearings 9.

The crank shaft 8 may be provided with a counterbalance such as 40 which has a wrist pin 41 and a pitman rod 42 connected thereto. It is by means of this pitman rod 42 that the walking beam and pumping mechanism in the well will operate as will be apparent from Fig. 5.

Figure 4:
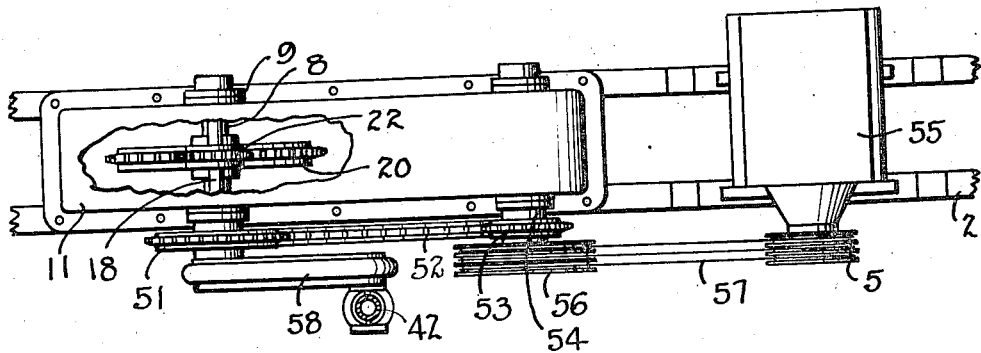
Fig. 4 is a top plan view looking down on the construction of Fig. 3.
Figure 3:
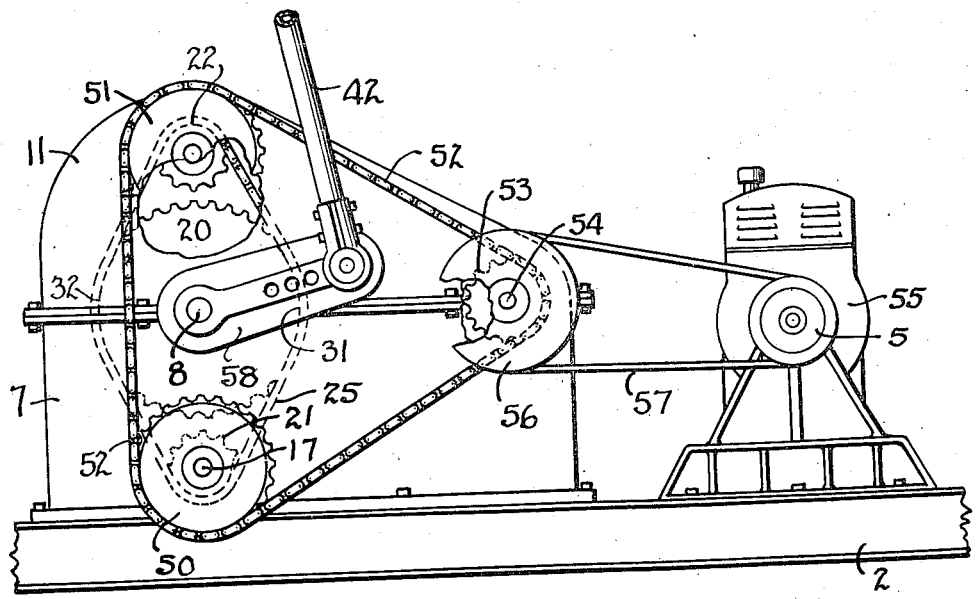
Fig. 3 is a side elevation of another application of the invention as applied to a pumping unit for wells in combination with a speed reducing mechanism.

Figs. 3 and 4 show another form of the invention which is somewhat similar to that shown in Figs. 1 and 2, except that the wheels 15 and 16 have been replaced with sprocket pinions 50 and 51 which receive the drive chain 52. This drive chain also passes around a driven sprocket 53 which is mounted on a shaft 54 carried by the housing 7. This construction is utilized when it is desired to further reduce the speed of rotation of the power unit such as 55.

The driven sprocket 53 is rotated by means of the wheel 56 which carries the multiple belt 57 which in turn passes over the wheel 5 which is driven by the power unit. With this construction there is a positive drive to the pinion sprockets 50 and 51 and there is a reduction in speed prior to the application of the power to the driven sprocket 53.

The internal sprockets in this form of the invention in Fig. 3 and Fig. 4 are the same as previously described in connection with Figs. 1 and 2 and the same reference characters have been used to designate the parts. A standard form of crank 58 is shown as connected to the pitman 42 in Fig. 3. It is to be understood that a counterbalance may or may not be applied to a construction of this sort. Particular attention is directed to the compact arrangement of the driven sprocket 53 and the wheel 56 so that the transmission of the power is in as nearly a straight line as possible to prevent excessive thrust upon the bearings.

Figure 5:
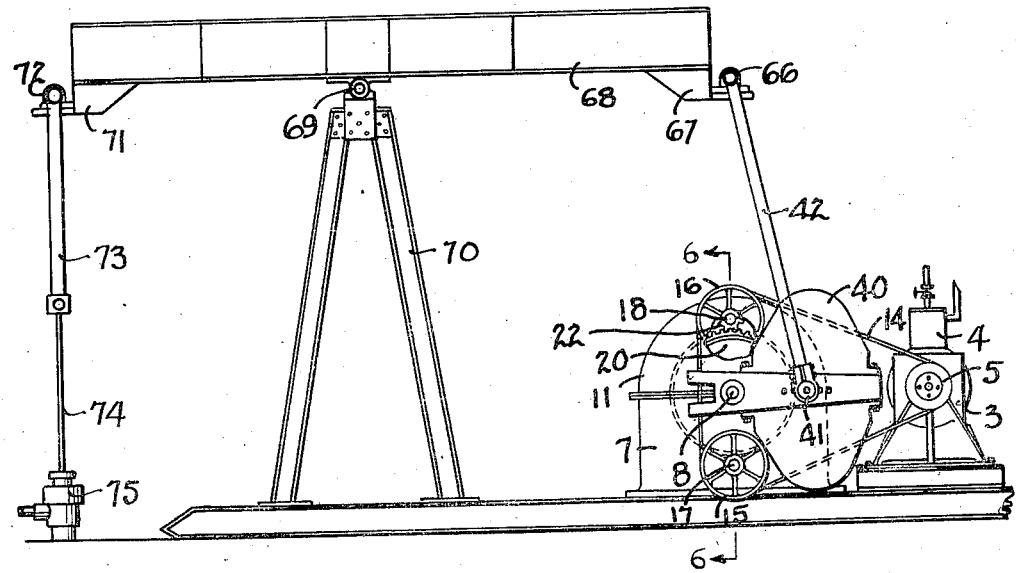
Fig. 5 is a diagrammatic view of a well head assembly including the walking beam and pumping unit wherein the invention has been adapted to a geared pumping unit.
Figure 6:
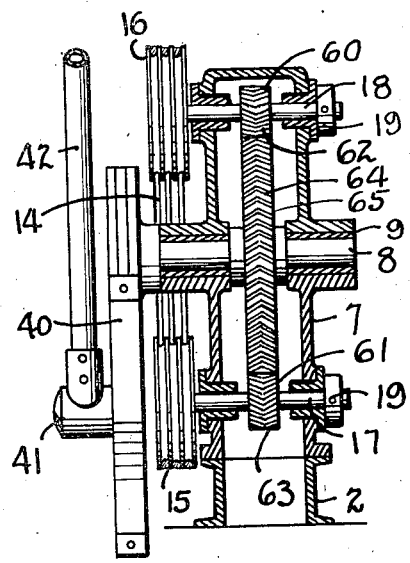
Fig. 6 is a section taken on the line 6—6 of Fig. 5.

Figs. 5 and 6 show a third arrangement of the mechanism where the unit 7 embodies gear wheels instead of the sprocket wheels as shown in Figs. 1 and 2. The other arrangement of the parts, however, is the same as described in connection with Fig. 1 and it is merely pointed out that the pinions 60 and 61 have the teeth 62 and 63 thereon, respectively, which mesh with the teeth 64 on the drive gear 65. The rotation of these pinions is effected by the wheels 15 and 16, the same as described in connection with Fig. 1.

The provision of two separate driving pinions such as 60 and 61 reduces the individual tooth pressure so that the parts may be properly lubricated and an enormous load transmitted due to the fact that a torque couple is applied to the drive gear 65. The arrangement of the pinions reduces the wear on all of the parts and equalizes the thrust upon the crank shaft bearings 9, so that a smooth and economical operation is assured.

In Fig. 5 the pitman 42 is shown as connected to a bearing 66 on the arm 67, which is connected to the walking beam 68. This beam is supported on the center iron 69, so that it may oscillate with respect to the support post 70. On the well end of this beam an arm 71 carries a bearing 72 to support the beam hanger 73, which is in turn connected to the pull rods 74. These rods pass through the well head 75 and downwardly into the well where they are connected to the pump. Oscillation of the beam 68 reciprocates the rods 74 to effect the pumping action. With deep wells it is not uncommon to have a load of many thousands of pounds upon the sucker rods due to the weight of the column of fluid in the well.

Figure 8:
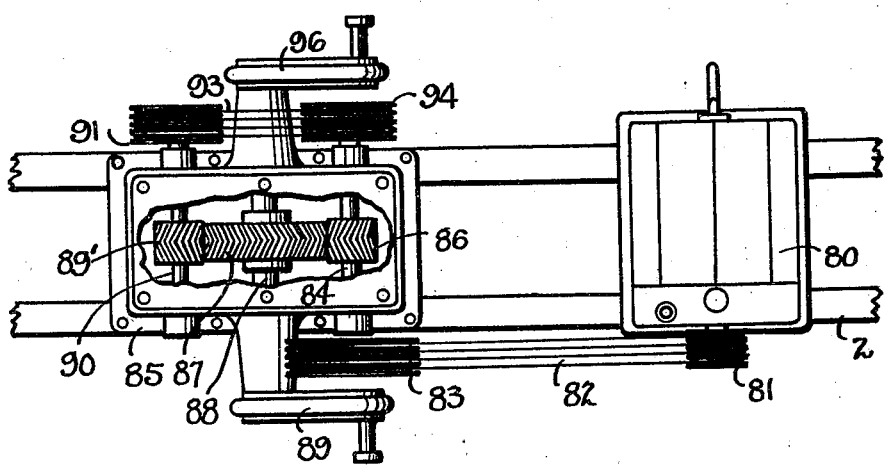
Fig. 8 is a top plan view of Fig. 7.
Figure 7:
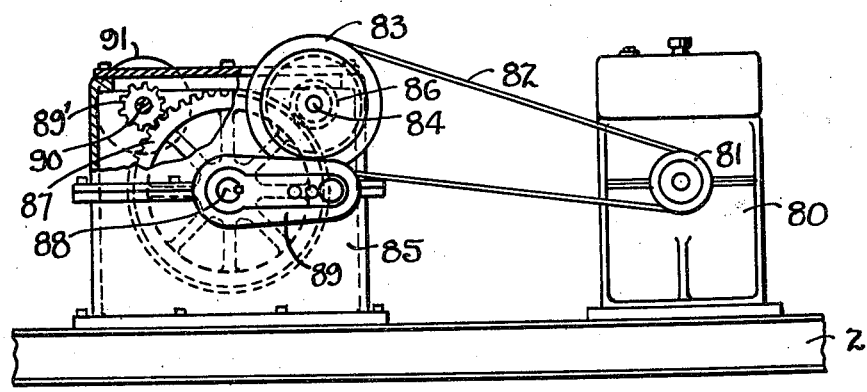
Fig. 7 is a side elevation of another application of the invention and illustrating an arrangement for applying the power to two spaced pinions.

Figs. 7 and 8 show a fourth form of the invention where the power unit 80 drives the wheel 81 in order to transmit power to the belts 82. These belts pass over the drive wheel 83 which is mounted on the shaft 84 carried by the housing 85. This shaft extends transversely through the housing and has the drive pinion 86 fixed thereto.

This pinion meshes with the drive gear 87 which is mounted on the crank shaft 88. The crank arm 89 is carried by this shaft and extends laterally from the housing seen in Fig. 8. In order to reduce the individual tooth pressure applied to the drive gear 87 a second pinion 89' has been provided and is mounted on the shaft 90. This shaft is driven by the wheel 91 which is fixed thereto. This wheel is in turn driven by the multiple belt arrangement 93 which passes over a wheel 94 affixed to the pinion shaft 84, which extends from the housing on the opposite side from the drive wheel 83. In this manner the power is applied at two points which are spaced from each other on the periphery of the drive wheel 87 so as to distribute the load and to reduce the wear upon the parts. The two shafts 84 and 90 are not spaced on the opposite ends of a diameter, as have been the pinions in the previous forms of the invention which have been described. With the arrangement shown in Figs. 7 and 8 the pinions are elevated to a convenient position and the wheels 91 and 94 are positioned on the opposite side of the housing from the drive wheel 83. This form of the invention is particularly adapted for use with what is known as a twin crank unit in that an extra crank 96 has been fixed on the crank shaft 88 where it extends from the opposite side of the housing. In this manner the load is equalized on the opposite ends of the crank shaft and a double pitman is used to transmit the power from the crank shafts 89 and 96 to the bearing 66, as seen in Fig. 5, or in some instances suitable pumping jacks may be connected to either or both of these cranks in order to operate a pumping power or a plurality of wells as desired.

With the present invention where chains or gears having a given capacity are used the effective load may be increased in proportion to the number of driving pinions or sprockets provided so long as practical applications were not exceeded.

All of the forms of the invention herein described are particularly adapted for transmitting enormous loads where one or more wells are being pumped from a single source of power and it is one of the principal objects of the invention to reduce the contact pressure of the parts so that the parts can be made smaller than would be otherwise required.

As a specific illustration, if the load to be transmitted by the drive gears 64 in Fig. 6, or 87 in Fig. 8, was so great that it would be necessary to make a gear having a width of, say, twelve inches, so as to provide a sufficient tooth area for contact between a single pinion and the teeth of the drive gear, the cost of such a construction would be tremendous. With the present arrangement, however, the same tooth area could be provided for by having a drive gear only six inches in width because of the fact that the contact is made at two points and there are two teeth in contact at all times. It seems obvious that a material saving is thus provided and if a factor of safety is desired the drive gear might be made, say, eight inches in width and it would then provide a safety margin to insure a satisfactory operation and its cost would be substantially reduced over that which would be required by a gear of a twelve inch width. The same explanation applies equally as well to the size of the chains and sprockets which are required in the other forms of the invention.

Broadly the invention contemplates the provision of a multiple contact for transmitting the load so as to reduce the individual contact pressure between the parts and to in this manner reduce the cost of construction and obtaining an economy in operation.

What is claimed is:

1. A double reduction drive unit comprising a power unit, a drive sheave rotatable thereby, a multiple belt passing over said sheave, a crank shaft, a housing support therefor, a drive member on said shaft, a pair of pinion shafts also in said housing, a sheave on each pinion shaft to receive said multiple belt, a pinion on each shaft, said shafts being disposed on opposite sides of said crank shaft so that the power of said pinions is applied to opposite sides of said drive member to effect rotation thereof.

2. In a drive unit of the character described, a driven gear, a plurality of pinions to apply power to drive said gear so that the load transmitted is divided between two pinions so as to reduce the tooth load applied at each point of contact, and belt means to simultaneously drive both of said pinions.

3. A gear box, a crank shaft therein, a drive gear for said shaft, a pair of spaced pinion shafts in said gear box, a pinion on each shaft, teeth on said drive gear and pinions which are intermeshing so that the power applied to the pinions is distributed at two points on said drive gear, a belt receiving pulley on each pinion shaft, and means to simultaneously drive said pulleys including a series of belts driven from a single source and passing over said pulleys.

4. A gear box, a shaft therein, a driven gear for said shaft, a pair of spaced pinion shafts in said gear box, a pinion on each shaft, teeth on said driven gear, a belt sheave on each pinion shaft, and pinions which are intermeshing so that the power applied to the pinions is distributed at two points on said drive gear, means to simultaneously drive said pinions, including a power unit and a multiple belt connection to extend to an dto drive both said sheaves driven.

5. A gear box, a driven shaft therein, a driven gear for said shaft, a pair of spaced pinion shafts in said gear box, a pinion on each shaft, teeth on said driven gear and pinions which are intermeshing so that the power applied to the pinions is distributed at two points on said driven gear, means to simultaneously drive said pinions, from a single source of power including a multiple belt connection, having driving belt sheaves on each of said pinion shafts at one side of said box and a drive sheave on one of said pinion shafts on the other side of said box.

DE VERE V. CARTER.